(12) United States Patent
Witte et al.

(10) Patent No.: US 10,345,109 B2
(45) Date of Patent: Jul. 9, 2019

(54) GENERATING ROUTES TO OPTIMISE TRAFFIC FLOW

(71) Applicant: TomTom Navigation B.V., Amsterdam (NL)

(72) Inventors: Nikolaus Witte, Berlin (DE); Oliver Kannenberg, Berlin (DE); Arne Kesting, Berlin (DE)

(73) Assignee: TOMTOM NAVIGATION B.V., Amsterdam (NL)

( * ) Notice: Subject to any disclaimer, the term of this patent is extended or adjusted under 35 U.S.C. 154(b) by 0 days.

(21) Appl. No.: 15/022,002

(22) PCT Filed: Sep. 15, 2014

(86) PCT No.: PCT/EP2014/069631
§ 371 (c)(1),
(2) Date: Mar. 15, 2016

(87) PCT Pub. No.: WO2015/036595
PCT Pub. Date: Mar. 19, 2015

(65) Prior Publication Data
US 2016/0223348 A1  Aug. 4, 2016

(30) Foreign Application Priority Data
Sep. 15, 2013  (GB) .................................. 1316386.0

(51) Int. Cl.
*G01C 21/34* (2006.01)
*G08G 1/0968* (2006.01)
(52) U.S. Cl.
CPC ......... *G01C 21/34* (2013.01); *G01C 21/3492* (2013.01); *G08G 1/096838* (2013.01)
(58) Field of Classification Search
CPC ................ G01C 21/34; G01C 21/3492; G08G 1/096838
See application file for complete search history.

(56) References Cited

U.S. PATENT DOCUMENTS 6,370,475 B1 * 4/2002 Breed .................. B60N 2/2863
340/436
6,490,519 B1 * 12/2002 Lapidot .................. G01C 21/34
340/905

(Continued)

FOREIGN PATENT DOCUMENTS

CN      1800783 A    7/2006
CN    101836080 A    9/2010

(Continued)

OTHER PUBLICATIONS

Maximal Flow Through A Network, Ford-Fulkerson (1956) Canadian Journal of Mathematics. doi:10.4153/CJM-1956-045-5. pp. 399-404, available online @ http://www.cs.yale.edu/homes/lans/readings/routing/ford-max_flow-1956.pdf; last accessed Apr. 30, 2017.*

(Continued)

*Primary Examiner* — Behrang Badii
*Assistant Examiner* — Daniel L Greene

(57) ABSTRACT

A method is disclosed for determining a route in an area covered by an electronic map, the map comprising a plurality of segments representing navigable segments of a navigable network in the area covered by the electronic map. The method involves generating a plurality of routes through the navigable network between a first location and a second location, determining a relative traffic flow value for each of the routes using data indicative of a relative current capacity of segments of the navigable network, and selecting a given one of the routes from the plurality of routes for use in navigating between the first location and the second location. The probability of a given one of the plurality of routes being selected is based on the determined relative flow value for the route.

18 Claims, 4 Drawing Sheets

(56) References Cited

U.S. PATENT DOCUMENTS

| | | | |
|---|---|---|---|
| 7,103,470 B2 | 9/2006 | Mintz | |
| 7,725,250 B2 | 5/2010 | Bisdikian et al. | |
| 8,116,969 B2 | 2/2012 | Kolb | |
| 8,471,728 B2* | 6/2013 | Flaherty | G08G 1/096 340/905 |
| 8,705,527 B1* | 4/2014 | Addepalli | H04W 4/046 370/389 |
| 8,712,675 B2 | 4/2014 | Grigsby | |
| 2002/0120390 A1* | 8/2002 | Bullock | G08G 1/096716 701/117 |
| 2004/0203827 A1* | 10/2004 | Heiner | H04L 45/10 455/452.1 |
| 2004/0246147 A1 | 12/2004 | Von Grabe | |
| 2004/0249559 A1 | 12/2004 | Mintz | |
| 2006/0058950 A1* | 3/2006 | Kato | B60R 11/04 701/409 |
| 2008/0019269 A1* | 1/2008 | Bisdikian | H04L 67/12 370/230 |
| 2009/0037086 A1* | 2/2009 | Kolb | G01C 21/3492 701/117 |
| 2009/0105940 A1 | 4/2009 | Bitan | |
| 2009/0299629 A1 | 12/2009 | Grigsby | |
| 2010/0171640 A1* | 7/2010 | Delia | G08G 1/07 340/907 |
| 2012/0016576 A1* | 1/2012 | Huang | G01C 21/3469 701/423 |
| 2015/0197248 A1* | 7/2015 | Breed | G08G 1/09626 701/93 |

FOREIGN PATENT DOCUMENTS

| | | | | |
|---|---|---|---|---|
| CN | 102483333 A | 5/2012 | | |
| CN | 102918361 A | 2/2013 | | |
| DE | 102012024144 A1 * | 7/2013 | ......... | G01C 21/3492 |
| WO | 2009053406 A1 | 4/2009 | | |
| WO | 2009116105 A2 | 9/2009 | | |

OTHER PUBLICATIONS

International Search Report of International Application No. PCT/EP2014/069631 dated Feb. 2, 2015.

Search report dated Mar. 14, 2014 for United Kingdom application No. GB1316386.0.

Baier et al, Project entitled "Algorithms for Optimal Route Guidance" performed by Technische Universitat Berlin with support from DaimlerChrysler—http://www3.math.tu-berlin.de/coga/projects/traffic/routeguidance, retrieved on Sep. 9, 2013.

Graphmasters—www.graphmasters.net; formerly known as the Greenway app and which was presented as part of the Microsoft Imagine Cup 2012.

* cited by examiner

GENERATING ROUTES TO OPTIMISE TRAFFIC FLOW

CROSS-REFERENCE TO RELATED APPLICATIONS

The present application is a National Stage of International Application No. PCT/EP2014/069631, filed on Sep. 15, 2014, and designating the United States, which claims benefit to United Kingdom Patent Application 1316386.0 filed on Sep. 15, 2013. The entire content of these applications is incorporated herein by reference.

FIELD OF THE INVENTION

This invention relates to methods and systems for generating routes, and also extends to navigation devices and servers arranged to generate routes, in particular, although not exclusively, in a manner that may more evenly balance traffic flow across a network. Illustrative embodiments of the invention relate to portable navigation devices (so-called PNDs), in particular PNDs that include Global Positioning System (GPS) signal reception and processing functionality.

BACKGROUND TO THE INVENTION

Portable navigation devices (PNDs) that include GPS (Global Positioning System) signal reception and processing functionality are well known, and are widely employed as in-car or other vehicle navigation systems.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power, and optionally data signals, can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account historical, existing and/or predicted traffic and road information.

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, an on-line route planning and navigation facility is provided at routes.tomtom.com, which facility allows a user to enter a start point and a destination, whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide, the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of the current road and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above provide a reliable means for enabling users to navigate from one position to another.

Often navigation devices are arranged to calculate a route to a destination in a manner that takes into account current conditions in the network, e.g. taking into account congestion. A fastest route may be generated for navigation in this manner. Once navigation commences, traffic conditions may change, such that the route is no longer the fastest route. In this situation, a new fastest route taking into account the actual traffic situation may be generated and proposed to a user. This may be as a result of a continual background check for faster routes under current conditions carried out, e.g. by a PND as navigation progresses, or might be in response to receiving a message indicative of a traffic event on the route ahead, e.g. via a live feed. Such methods are responsive to actual traffic conditions, simply providing a new faster route when the existing route is no longer the fastest route.

The use of vehicle-based navigation devices of various types is becoming more prevalent. For example, navigation devices, including mobile devices, such as PNDs, and integrated systems, e.g. in-dash systems, are increasingly being used in vehicles. However, this may lead to problems when the navigation devices are arranged to take into account real-time traffic information when planning routes. When multiple vehicles travelling in or toward an area affected by congestion use such devices, each device may suggest an alternative route to the driver of its respective vehicle in the manner described above, to enable the driver to avoid the congested area. However, if each device is acting on similar congestion information, and calculates routes in a similar manner, e.g. to provide a new fastest route, the devices will tend to divert drivers onto similar alternative routes. This may have the effect that, rather than reducing overall levels of congestion in the network, the congestion is merely shifted to a different location, i.e. along the alternative routes suggested to drivers. This effect may be particularly significant when a major event, such as a major road closure or obstruction is involved.

Various attempts have been made to address this problem, and to try to cause navigation devices associated with different vehicles to calculate alternative routes in the event of congestion which will result in traffic load being spread over the road network in a more uniform manner. One technique involves using a central server to balance traffic flow across a road network. When a navigation device needs to calculate a route, e.g. in response to congestion being found on an existing route or otherwise, the device sends a route request to the server. The server receives such route requests from multiple devices, and determines routes specifically for the individual devices, and transmits the routes to the respective devices. The routes for the different devices are determined in a manner that is intended to distribute flow more evenly across the road network. In order to achieve this, when a new route is calculated, it is done so in such a way that it is dependent upon previous routes calculated for other navigation devices. Indeed, in some cases, routes for all navigation devices are recalculated whenever a new route request is received. This solution is therefore computationally intensive, and difficult to scale. One example of such a solution is the system proposed and developed by Graphmasters—www.graphmasters.net; formerly known as the Greenway app and which was presented as part of the Microsoft Imagine Cup 2012. Another technique of this type was created as part of a project entitled "Algorithms for Optimal Route Guidance" performed by Technische Universität Berlin with support from DaimlerChrysler—http://www3.math.tu-berlin.de/coga/projects/traffic/routeguidance/, and which aims to distribute traffic flow in a manner that minimises overall travel time of all users through the network.

The Applicant has realised that there remains a need for improved and more efficient methods for generating routes in a navigable network, which try to balance traffic flow across the network.

SUMMARY OF THE INVENTION

In accordance with a first aspect of the invention there is provided a method of determining a route in an area covered by an electronic map, the map comprising a plurality of segments representing navigable segments of a navigable network in the area covered by the electronic map, the method comprising:

generating a plurality of routes through the navigable network between a first location and a second location, and determining a relative flow value for each of the routes using data indicative of a current capacity of segments of the navigable network; and selecting a given one of the routes from the plurality of routes for use in navigating between the first location and the second location, wherein the probability of a given one of the plurality of routes being selected as the route to be navigated is based on the determined relative flow value for the route.

In accordance with the invention, a method is provided that enables a route across a network of navigable segments to be generated in a manner that may help to balance load, i.e. traffic flow, across segments of the network in a more efficient manner than prior art techniques allowed. This is achieved by using data indicative of a current capacity of segments of the navigable network to obtain a value indicative of the relative traffic flow along each of a plurality of possible routes between a first location and a second location. A given one of the routes is then selected for navigation, with the probability of the route being selected from among the plurality of routes being based on the relative flow value for the route. For example, based upon current capacity data, it may be determined that three possible routes have relative flow rates of 70%, 20% and 10% respectively. The probability of a given one of the routes being selected for navigation is weighted based on with the relative flow value for the route. In a simple embodiment, the probability of a route being selected may correspond to the relative flow rate for the route.

In this way, when the method is used to provide routes for use by multiple users, the overall distribution of the routes selected for different users for navigation will reflect the flow rate values for the routes, such that routes with a higher flow rate value are more likely to be selected than those with lower flow rate values. This results in traffic load being more evenly distributed across the network in accordance with the capacity of the segments, reducing the likelihood of creating congestion. In contrast to prior art techniques discussed above, this is achieved without the need to know what routes may have been selected for other users. For example, multiple navigation devices may independently select routes for navigation in accordance with the invention, with the selected routes then being appropriately distributed among the possible routes having regard to the flow rate possible along the routes (based on the capacity of the segments of the routes), and without a given navigation device needing to have knowledge of the routes that have been selected by the other navigation devices. This significantly reduces the amount of processing required. Furthermore, in preferred embodiments at least, the present invention provides a method that may enable individual navigation devices to independently generate appropriate routes which may help to balance load over the network. This is in contrast to prior art methods which relied upon a central server to carry out route generation and selection on behalf of individual navigation devices, as was necessitated by techniques which required overall coordination of route selection for a given navigation device based upon routes selected for other navigation devices.

The present invention extends to a system for carrying out a method in accordance with any of the aspects or embodiments of the invention herein described.

In accordance with a second aspect of the invention there is provided a system for generating routes in an area covered by an electronic map, the map comprising a plurality of segments representing navigable segments of a navigable network in the area covered by the electronic map, the system comprising:

means for generating a plurality of routes through the navigable network between a first location and a second location, and means for determining a relative flow value for each of the routes using data indicative of a current capacity of segments of the navigable network; and means for selecting a given one of the routes from the plurality of routes for use in navigating between the first location and the second location, wherein the probability of a given one of the plurality of routes being selected as the route to be navigated is based on the determined relative flow value for the route.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

The present invention is a computer implemented invention, and any of the steps described in relation to any of the aspects or embodiments of the invention may be carried out under the control of a set of one or more processors. The means for carrying out any of the steps described in relation to the system may be a set of one or more processors.

In general, the system of the present invention in any of its embodiments may be at least one processing device. The or a processing device may be a device of a mobile device, such as a navigation device, whether a PND or an integrated device, or may be a device of a server.

The method of the present invention is preferably implemented in the context of a navigation operation.

In preferred embodiments the method of the present invention in any of its aspects or embodiments is carried out using a navigation device, and the present invention extends to a navigation device arranged to carry out the steps of the method of any of the aspects or embodiments of the invention. The navigation device may be of any form, and may be a mobile or integrated, e.g. in-vehicle device. The device is preferably associated with a vehicle, i.e. such that the position of the device corresponds to the position of the vehicle. A navigation device may be any device having navigation functionality. For example, a mobile navigation device may be, for example, a PND or any mobile device having navigation functionality.

In accordance with any of the aspects or embodiments of the invention the navigation device may comprise a display for displaying an electronic map to a user, a set of one or more processors configured to access electronic map data and cause an electronic map to be displayed to a user via the display, and a user interface operable by a user to enable the user to interact with the device. Thus, the system of the present invention may be a system e.g. processing device of a navigation device.

In these preferred embodiments, it will be seen that the invention provides a method for determining a route through a navigable network in a manner that may help to balance overall load in the network, which method may be carried out on a client device, i.e. remote from a server. This is in contrast to prior art techniques which must be carried out at a server, in order for the server to be able to derive a route for use by a navigation device that takes into account routes derived for other navigation devices. The ability to carry out the method at the client device stems from the concept of selecting a route from among a plurality of possible routes with a probability that is based on a relative flow value determined for each route using data indicative of a current capacity of the segments of the route. When multiple devices use this method for determining routes for navigation, the overall effect will be that traffic load will be more balanced over the network.

Of course, it is envisaged that a server could carry out the steps of the present method, and select a route that is then transmitted to a navigation device for use in navigation between the first and second locations. Thus, in some other embodiments the method may be implemented by a server. The method may then further comprise the server transmitting the selected route to a navigation device for use by the device in navigation between the first and second locations. The method may additionally comprise the steps of the server receiving from a navigation device an indication of the first and second locations. The indication may be transmitted by a navigation device to the server as part of a request for a route to be generated by the server for use in navigation between the first and second locations. It is believed that the methods of the present invention provide advantages over prior art techniques when implemented by a server, due to the reduced amount of processing power required. As described in relation to embodiments in which a navigation device carries out the route generation steps, the present invention may provide a method of obtaining a route that enables load to be more evenly distributed across a network in a more efficient manner, in that it is not necessary, when generating a given route, to have knowledge of other routes that have been generated. This allows the method to be implemented with reduced processing and/or storage capacity than would be the case for prior art methods in which it is necessary to retain and refer to details of previously generated routes.

Thus, in other embodiments the method of the present invention in any of its aspects or embodiments may be carried out by a server, and the present invention extends to a server arranged to carry out the steps of the method of any of the aspects or embodiments of the invention. The system of the present invention of any of its aspects or embodiments may be a processing device of a server.

In yet other embodiments the steps of the method of the present invention in any of its aspects or embodiments may be carried out in part by a server and in part by a navigation device.

The method comprises the step of generating a plurality of routes between a first location and a second location. The first location may be a current location, a location along a predetermined route being navigated, and/or an origin of a desired route. A location along a predetermined route being navigated may be a current location along a predetermined route being navigated or a position ahead of a current location. For example, the first location might be a location along the predetermined route that will be reached at a particular future time, or which corresponds to a decision point along the remainder of the predetermined route, etc. Preferably the first location is the current location. The current location may be a current location of a navigation device, which may be associated with a vehicle.

The second location may be a desired destination, a destination of a predetermined route being navigated, or a location along a predetermined route being navigated. The second location may be the destination of the predetermined route being navigated or a location along the predetermined route beyond the first location in the direction of travel. The generated routes between the first and second locations may be intended to provide a continuation to a predetermined route being navigated e.g. an extension of the predetermined route, or a modified remainder or section of the predetermined route which becomes a new route to be followed. In these situations the first location might be automatically selected.

Thus, in some embodiments the method is carried out after travel along a predetermined route has commenced. The method may then provide a route that is an alternative to at least a portion of a remainder of the predetermined route, or, in embodiments, the (entire) remainder thereof. The route may then be described as an "en-route alternative". In some embodiments the method comprises generating a first route between a first route origin and a first route destination in the area, wherein the plurality of routes generated between the first location and the second location provide alternative routes to at least a portion of a remainder of the first route. These embodiments may be used, for example, where it is found that at least a portion of the remainder of the predetermined route is affected by congestion. The present invention may then provide a way of determining an alternative route that is less affected by congestion.

In other embodiments the first and second locations are an origin and a destination. These embodiments may be particularly applicable where the steps of the method, including the generation of the alternative route, are carried out before navigation along a route occurs. The origin and destination may be user specified.

It will be appreciated that where the first location and/or the second location is a location along a predetermined route being navigated, the method may or may not extend to the step of generating the predetermined route that is being navigated.

The first and second locations may be obtained in any suitable manner. For example, one or both locations may be user specified. In other arrangements the locations may be automatically determined, e.g. by a navigation device or server. For example, this may be the case where the first and/or second locations are associated with a predetermined route being navigated, to provide first and second locations between which alternative routes to at least a portion of the predetermined route may be generated. The first and/or second locations may be received via a communications network.

It will be appreciated that the method of the present invention may be initiated in response to a user input, e.g. requesting the generation of a route, or may be initiated automatically, e.g. when congestion is detected along a predetermined route that is being navigated. The method may be initiated by the navigation device in response to received live traffic data.

The plurality of routes generated between the first and second locations may be considered alternative routes between the first and second locations. The routes may be generated in any suitable manner known in the art. For example, the routes might be a least cost route and one or more next lowest cost routes generated between the first and second locations through the navigable network as determined by a routing engine. For example, the routes may be a least cost route and each route having a higher cost within a predetermined range of the least cost route. The cost of a route may be determined using a cost function that takes into account any desired attributes of the segments of the navigable network, e.g. travel time, average speed, length, etc. A least cost route may be based upon minimising a cost associated with traversing segments of the navigable network, which cost is determined using an appropriate cost function. For example, the cost function may be selected as appropriate e.g. based upon user input, to result in a least cost route that is a shortest route, fastest route, most ecological route, etc. In an example, when a cost function is selected to determine a fastest route, the plurality of routes may determine the fastest route and any routes that are within a threshold of the journey time associated with the fastest route, e.g. any routes within 10% of the fastest route or 20% of the fastest route, etc.

The method involves generating the plurality of routes, and determining a relative flow value for each of the routes using current capacity data for segments of the route. It will be appreciated that these steps may or may not be sequential. For example, the plurality of routes may first be generated, e.g. by a first algorithm, and a relative flow value then obtained for each route based on the current capacity data for segments of the route, e.g. using a second algorithm. However, it is envisaged that alternatively, and preferably, the step of determining a relative flow value for the routes may be carried out concurrently with the step of generating the routes, e.g. using the same algorithm. This may be achieved using a cost function that takes into account the data indicative of the current capacity of segments of the navigable network. It will be seen that current capacity may be used together with other attributes of segments, e.g. traversal time, etc in determining a cost for traversing the segment, which may be used in determining a route through the network, e.g. a least cost route.

In accordance with the invention, a limited number of routes is generated between the first and second locations. The plurality of generated routes is a subset of possible routes between the first location and the second location. In some embodiments, the subset of routes comprises an optimum route, e.g. fastest route, shortest route, etc, and any routes (or up to a predetermined number) within a predetermined threshold of the optimum route.

The subset of routes may be selected in various manners. In some embodiments the method comprises generating a predetermined number of routes between the first and second locations. The method may comprise then determining a relative flow value for each of the routes, e.g. using the data indicative of the current capacity of the segments of each route. In other words, in these embodiments, the method may involve two distinct steps; first of generating the routes between the first and second locations, and then secondly determining a flow value for each of the routes. In such embodiments the step of generating the routes is thus carried out without reference to current capacity data of segments of the navigable network. This may be achieved using specific, different algorithms for route generation and obtaining relative flow values for routes.

In preferred embodiments, the plurality of generated routes are a subset of possible routes between the first location and the second location, the subset of routes being selected by reference to a flow value of the routes. Preferably the subset of routes are routes having a flow value that exceeds a given flow threshold value. The flow values for each route is determined using data indicative of a current capacity of segments of the navigable network. In these embodiments the steps of generating the plurality of routes and determining a relative flow value for each route may advantageously be combined, as a flow value for each route will be determined as part of the process of selecting the subset of routes. These steps may then be carried out using the same algorithm.

In accordance with the invention in any of its embodiments, a relative flow value is obtained for each of the generated routes. As mentioned above, and in general, whether or not the subset of routes is obtained in accordance with the particular embodiments described, the relative flow value may be determined as part of the process of generating the plurality of routes, i.e. the subset of possible routes through the network, or may be determined in a separate subsequent step to route generation in relation to each of the generated routes, i.e. each of the subset of generated routes. The relative flow value for a given one of the generated routes is indicative of a flow value for the route relative to the total flow value for all of the generated routes. The relative flow value may be any measure indicative of relative flow.

The method comprises selecting a given one of the routes from the plurality of generated routes for use in navigating between the first and second locations. The given one of the routes is selected randomly from among the plurality of generated routes. In the process of selecting a given one of the routes from among the plurality of generated routes, each route has a probability of being selected that is based on the determined relative flow value for the route. The relative flow value for a route refers to the flow value of the route relative to the total of the flow values associated with each of the plurality of routes. The probability of selecting each route is weighted in accordance with the relative flow value for the route. The probability may correspond to the relevant flow value for the route, or may be based on the flow value in any suitable manner. For example, the probability of selecting a route may be proportional to the flow value for the route. The probability of a route being selected from among the plurality of generated routes increases as the flow rate value of the route increases and vice versa. In this way, a route having a relatively higher flow value is more likely to be selected than a route having a relatively lower relative flow value.

Regardless of where the generation and selection of the route to be navigated occurs, the method may further comprise the step of outputting data indicative of the selected route, e.g. using a navigation device. The method may comprise outputting data indicative of the selected route to a user. The data may be in any way indicative of the route, e.g. a set of instructions, which may be audible or visual, but preferably is a visual representation of the route. In preferred embodiments, the method comprises displaying the route to a user. However other forms of output may be used. For example the method may alternatively or additionally comprise printing information indicative of the route. In preferred embodiments, a step of displaying the route may comprise superposing the route on the electronic map. Alternatively or additionally the method may comprise the steps of generating a set of navigation instructions for guiding a driver along the selected route. Alternatively or additionally the method may comprise storing the selected route. This step may be performed by a navigation device.

The present invention involves using data indicative of a current capacity of segments of the navigable network in determining a relative flow value for each of the generated routes, and, in some embodiments, additionally in generating the routes. It will be appreciated that the current capacity data used in determining the relative flow value for a given route may or may not be limited to the capacity data relating to segments of the route. In embodiments in which determining flow values and routes occurs concurrently, current capacity data for segments of the navigable network other than those that ultimately form part of the routes may be used, i.e. in exploring potential routes through the network between the first and second locations. For example, flow values associated with possible routes through the network between the first and second locations may be determined and compared to a threshold to select a subset of the possible routes as described above. In other embodiments the relative flow values for each route are determined based upon the current capacity data for the segments forming part of the route, e.g. using capacity data associated only with such segments. This may be the case where the route generation and determining of relative flow values occur sequentially.

The current capacity data for the navigable segments may be used in any suitable manner to obtain the relative flow value for a route. The relative flow values are with respect to those routes defined in the plurality of generated routes, i.e. the subset of all possible routes between the first and second locations provided by the plurality of generated routes. The plurality of generated routes may be considered as defining a network of navigable segments in its own right between the first and second locations. This network is a sub-network of the network of navigable segments. The current capacity data of navigable segments of the network of navigable segments (which may or may not be limited to the segments of the sub-network) may then be used to determine the relative flow along each of the routes of this sub-network of navigable segments.

The relative flow value for a given route is indicative of the proportion of overall flow between the first location and the second location via all of the plurality of generated routes that will pass along the given route. Thus, the relative flow is a relative flow with respect to the plurality of routes that are generated and considered for the purposes of the invention. The overall flow between the first and second locations via the plurality of routes corresponds to a flow across a sub-network of navigable segments defined by the segments of the plurality of routes. The overall flow may be the sum of the flows along each of the plurality of routes between the first and second locations. The overall flow and flow along each given route is determined based on the capacity of segments of the navigable network, or, in embodiments of the plurality of routes. The relative flow value for a given route may be indicative in any manner of the proportion of overall flow that will pass along that route between the first and second locations. The flow along a route herein refers to a traffic flow, i.e. a flow of vehicles which follow the route from the first location to the second location.

In preferred embodiments the relative flow values for each of the routes of the plurality of routes are based on a flow along each route under conditions of maximum flow between the first and second locations via the plurality of routes between the first location and the second location. The relative flow values are flow values which will provide a maximum flow between the first and second locations across a sub-network of navigable segments defined by the plurality of routes between the first location and the second location. The determination of the relative flow values is based on the current capacity data of navigable segments of the network, and, in embodiments, of the navigable segments of the plurality of generated routes.

Algorithms which may provide a maximum flow across a network based on the current capacity of segments thereof are known in the art. The first and second locations may be modelled as a source and sink of the network being considered. In some preferred embodiments an algorithm based on the Ford-Fulkerson algorithm is used. Such an algorithm may be used for the concurrent generation of routes and determination of relative flow values.

The current capacity data used in accordance with the invention may be indicative in any manner of the current capacity of the navigable segment to which it relates. The capacity data may be the capacity, or it is envisaged may be data allowing the capacity to be determined. The capacity data is indicative of a current capacity in that it provides an indication of what is currently occurring on the segment, or at least what has occurred relatively recently. "Current" capacity data may typically relate to the conditions on the segment, for example, within the last ten minutes or five minutes.

The current capacity data may or may not be based on "live" capacity data i.e. data that is obtained in real-time, reflecting the relatively current conditions occurring on the signal. Preferably the data is, however, based at least in part on live capacity data. "Live" data may similarly relate to conditions on the segment in the last ten minutes or five minutes. As will be described in more detail below, the current capacity data for a segment may in fact be based at least in part, or even entirely, upon historical capacity data for the segment, provided that it has been verified, directly or indirectly, that this appropriately reflects current conditions. For example, a navigation device may store historical capacity data for segments, preferably that is time dependent. The device may receive updates of "live" capacity data only in relation to segments for which the actual current capacity differs from the expected capacity based on the relevant historical data by a predetermined amount. The device may use this data to modify the historical data and provide current capacity data for the segment. Thus, the current capacity data may be based only in part on live data. The current capacity data may be based in part on historical data. When the historical capacity data still adequately reflects current conditions, no updated information will be received by the navigation device, and the historical data may be used as the current capacity data for the segment. Thus, the current capacity data may be based entirely on historical capacity data for the segment.

In this context the word "historic" should be considered to indicate data that is not live, that is data that is not directly reflective of conditions on the segment at the present time or in the recent past (perhaps within roughly the last five or ten minutes). Historic capacities may for example relate to conditions on the segment days, weeks or even years in the past. While such data may not therefore be a result of monitoring present road conditions, it may still be indicative of the current capacities for segment where the current capacity is as would be expected, e.g. for the given time.

The current capacity data of each navigable segment that is used in determining the flow values for the routes is indicative of the current capacity of the segment relative to a maximum capacity for the segment. Thus the current capacity is indicative of the relative current capacity of the segment. The "relative capacity" as used herein therefore refers to the capacity of a segment relative to a maximum capacity of the segment. The maximum capacity of a segment may correspond to a threshold capacity value above which the segment is deemed to be congested. The maximum capacity may be determined empirically or theoretically, e.g. based upon the number of lanes, number of traffic light cycles, road category etc. of the segment. The maximum capacity of a segment may be an attribute of the segment, e.g. associated with electronic map data indicative of the segment. In other embodiments, the maximum capacity of a segment may be a predetermined maximum capacity that has been arbitrarily set for a segment. For example, a maximum capacity may be set for a segment for various reasons, e.g. by a third party, such as a traffic management centre or road network planner. A maximum capacity might be set in order to try to divert traffic toward other segments, or to try to maintain environmental impact below a particular level in the region of the segment, etc. The maximum capacity may therefore be an artificial maximum capacity that is less than an actual or theoretical maximum capacity of the segment.

The current capacity data is indicative of current conditions along the segment. Thus, the capacity data will take into account current traffic conditions, e.g. congestion, etc that may be affecting the capacity of the segment. The method extends to the step of obtaining the current capacity data. This may be achieved in any suitable manner. The current capacity data may be obtained from one or more live (or real-time) traffic feeds. The current capacity data for a segment may be determined based upon one or more current attributes of the segment, e.g. current speed profile for the segment. Such data may be used in conjunction with other attributes of the segment (which may not be varying), such as number of lanes, traffic lights present along the segment, etc, to obtain capacity data. The current capacity data may be determined by the server; the server or a communication means connected to thereto transmitting the data to one or more devices.

Preferably the method comprises receiving data indicative of a current capacity of at least some of the segments of the navigable network. These embodiments are preferred as they provide the ability to transmit live current capacity data for use in the methods of the invention, such that the flow values determined may be based at least in part upon live capacity data. The step of receiving the data is preferably carried out by a navigation device. The device preferably also carries out the steps of generating the plurality of routes, determining the relative flow values of the routes, and selecting a given one of the routes. The at least some of the segments for which current capacity data is received preferably include at least some, or all, of those segments whose current capacity data is used in obtaining the flow values for each of the plurality of routes in accordance with the invention. As will be discussed below, current capacity data for some of the navigable segments may already be known to, e.g. stored by, a device. Preferably the method comprises receiving the current capacity data from a server. The server may be a server of a live traffic information system. The method may comprise receiving the current capacity data over a mobile telecommunications network. The method extends to the step of transmitting the current capacity data, e.g. to a navigation device, for use in the methods of the present invention. The method may further comprise the step of, e.g. a server, transmitting the current capacity data a device, such as a navigation device. It will be appreciated that in other embodiments, the data may be received in other manners. The data may be obtained from any source of live traffic information. For example, the current capacity data may be received via broadcast methods, e.g. by a radio broadcast, such as via the Traffic Message Channel (TMC) system or other similar type of system.

The use of a processing device, such as a server, to provide current capacity data in relation to segments of a navigable network is believed to be advantageous in its own right.

In accordance with a further aspect of the invention there is provided a processing device, optionally a server, comprising means for generating electronic map data in relation to one or more segments representing navigable segments of a navigable network in an area covered by an electronic map, the generated electronic map data comprising data indicative of a current capacity of the one or more segments, the processing device being connectable to a communications device for transmitting the data indicative of a current capacity of one or more navigable segments to a navigation device.

The current capacity data for a segment may be in the form of an attribute which may be associated by the navigation device with the electronic map data indicative of the segment. The processing device, e.g. server, may be arranged to transmit the current capacity data in association with data indicative of the or each navigable segment to which it relates.

The communications device, which is preferably capable of transmitting data to devices over a wireless telecommunications network, may be separate to the processing device, such that the generation of the electronic map data occurs at a different location from the accessing of this data for transmittal to a navigation device. In other embodiments, the processing device and communications device may be combined within the same system at a single location.

The present invention extends, in another aspect, to a method of operation of a processing device, optionally a sever, the method comprising generating electronic map data in relation to one or more segments representing navigable segments of a navigable network in an area covered by an electronic map, the generated electronic map data comprising data indicative of a current capacity of the one or more segments. The method preferably comprises transmitting the data indicative of a current capacity of one or more navigable segments to a navigation device.

As will be appreciated by those skilled in the art, these further aspects of the present invention can and preferably do include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

The current capacity data generated by the server in these further aspects may be in accordance with any of the embodiments described herein in relation to the earlier aspects of the invention. The current capacity data is preferably based on live capacity data for the or each segment. The current capacity data may be obtained in any suitable manner by the server using one or more sources of data e.g. positional data (or probe data), vehicle to vehicle (V2V) data, road loops, third party data, etc. The source of data may be one or more live (or real-time) traffic feeds.

In preferred embodiments the live capacity data is obtained using positional data relating to the movement of a plurality of devices along the segments of the navigable network. The positional data is indicative of the position of the devices with respect to time. The positional data is therefore preferably associated with time data. The positional data may be positional data that is not necessarily received specifically for the purposes of the present invention. For example, the data may be data obtained from an existing database of such "probe" data, from which the relevant data may be filtered out. In some arrangements the step of obtaining the data may comprise accessing the data, i.e. the data being previously received and stored. In other embodiments, the step of obtaining the positional data comprises receiving the data from the devices, e.g. at a server. Preferably the received data is positional data and associated time data. In arrangements in which the method involves obtaining or receiving the data from the devices, it is envisaged that the method may further comprise storing the received positional data before proceeding to carry out the other steps of the present invention.

As discussed above, the positional data relates to the movement of the devices with respect to time, and may be used to provide a positional "trace" of the path taken by the device. The devices may be any mobile devices that are capable of providing the positional data and sufficient associated timing data for the purposes of the present invention. The device may be any device having position determining capability. Typically the device may comprise a GPS or GSM device. Such devices may include navigation devices, mobile telecommunications devices with positioning capability, position sensors, etc. The device is preferably associated with a vehicle. In these embodiments the position of the device will correspond to the position of the vehicle. The device may be integrated with the vehicle, e.g. in-built sensor or navigation apparatus, or may be a separate device associated with the vehicle such as a (removably mountable) portable navigation apparatus. Of course, the positional data may be obtained from a combination of different devices, or a single type of device, e.g. devices associated with vehicles.

It will be appreciated that the positional data obtained from the plurality of devices, may be referred to as "probe data". References to probe data herein should therefore be understood as being interchangeable with the term "positional data", and the positional data may be referred to as probe data for brevity herein.

The method may comprise the server providing the current capacity data for use by a navigation device in performing a method in accordance with any of the embodiments described herein. It will be appreciated that the server in accordance with these further aspects may operate in accordance with any of the embodiments described below, in which the server is said to carry out any steps.

In accordance with the invention in any of its aspects or embodiments in which current capacity data is transmitted and/or received for use in the methods described herein, the data which is received may or may not be of the same form that is used in obtaining the flow values for the routes. For example, where relative current capacity data is used in flow value determination, absolute current capacity data may be received, and converted to relative current capacity data for use in the method. Thus, the received and used current capacity data are both indicative of a current capacity of the navigable segments, but may be indicative of different forms of current capacity. The current capacity data for a segment may be in the form of an attribute which may be or is associated with the electronic map data indicative of the segment.

The current capacity data that is received, and, in any of the various aspects or embodiments of the invention transmitted, may be relative current capacity data for each navigable segment. In any of the aspects or embodiments of the invention involving the transmission of current capacity data, the method may comprise a server determining data indicative of a current absolute capacity of each of the navigable segments, and using the determined data together with data indicative of the maximum capacity of each segment to obtain data indicative of a current relative capacity of each segment for transmission to a navigation device. The server may be arranged to store the maximum capacity data for each navigable segment. These embodiments, in which the current capacity data that is received is indicative of a current relative capacity of the segment, avoid the need for the navigation device to store maximum capacity data for segments.

In other embodiments the method may comprise receiving data indicative of an absolute current capacity for each navigable segment, and using the data together with data indicative of a maximum capacity for each navigable segment to obtain data indicative of a relative current capacity for each segment. The absolute current capacity data may be received by a navigation device, which preferably uses the data to obtain a relative current capacity data for each segment. The method extends to the step of a server transmitting the absolute current capacity data to the navigation device. The server of the further aspects of the invention may be arranged to transmit such absolute capacity data. The method may comprise the step of a client device, e.g. a navigation device, determining the data indicative of the maximum capacity for some or each navigable segment. The step of determining may involve accessing stored maximum capacity data for each segment, or deriving maximum capacity data for each segment. Thus, in some embodiments, the maximum capacity data for each navigable segment may be stored data, and the method may comprise a client device, e.g. a navigation device, storing electronic map data indicative of each navigable segment, and retrieving the stored maximum capacity data for use in obtaining the relative current capacity data for the segment. For example, the data indicative of the maximum capacity of each segment may be associated with electronic map data indicative of each segment. The maximum capacity data for a segment may be stored as an attribute associated with the electronic map data indicative of the segment. In other embodiments the method may comprise determining the maximum capacity data for each segment using data indicative of one or more attributes for the segment associated with the electronic map data indicative of the segment. For example, the maximum capacity data may be determined based on attributes including, for example, number of lanes, road class, etc.

The method may comprise the step of a client device, e.g. a navigation device, storing received data indicative of a current capacity of navigable segments. The data may be stored in association with electronic map data indicative of the segments.

In embodiments in which current capacity data is received and/or transmitted, the current capacity data relates to at least some of the navigable segments of the navigable network. The current capacity data may or may not relate to each of the navigable segments for which current capacity data is used in determining relative flow values for routes in accordance with the invention. In some embodiments the method comprises storing historic capacity data associated with electronic map data indicative of segments of the navigable network. The historic capacity data may be in the form of absolute or relative capacity data for the segments. The historic capacity data for each navigable segment is preferably time dependent. In these preferred embodiments, the historic capacity data is indicative of the capacity of a segment in a given time period. In some preferred embodiments each segment is associated with data indicative of a plurality of historic capacities, each being in respect of a different given time period. It may be for example that historic capacities for segments are stored for time periods corresponding to different times of the year, days of the week and/or times of day.

The method may comprise receiving and/or transmitting current capacity data only in relation to those segments for which the current capacity differs from the historic capacity data for the segment (i.e. for the time applicable to the current time) by a predetermined amount. In these embodiments the server transmitting the current capacity data will have knowledge of the historic capacity data stored by the navigation device to enable the server to determine when current capacity data for a segment differs from the stored historic data by a predetermined amount. In accordance with the further aspects or embodiments of the invention, the method may comprise the server storing historic capacity data for each of a plurality of navigable segments of the navigable network represented by the electronic map, determining data indicative of a current capacity of navigable segments of the network, and transmitting data indicative of the current capacity of a navigable segment to a navigation device only when the current capacity differs from the stored historic capacity for the segment by a predetermined amount.

In these embodiments the current capacity data used by the device in obtaining the relative flow values of the present invention may correspond to stored historic data for the segment where this still reasonably reflects current capacity of the segment. Where the historic capacity data is absolute capacity data, the device may first obtain historic relative capacity data for the segment using data indicative of the maximum capacity for the segment, e.g. stored maximum capacity data. However, preferably the historic capacity data is relative capacity data. Thus the current capacity data may or may not be live data provided that it can be considered to reflect current capacity on the segment, e.g. implicitly in the absence of any updated current capacity data for the segment being received.

The at least some of the navigable segments of the network for which current capacity data is obtained, e.g. received and/or transmitted, may be a subset of the navigable segments of the navigable network determined based on one or more of: a current location (i.e. of a client device performing the method); the first location; and the second location. The subset of the navigable segments may be a subset of navigable segments within an area based on one or more of the current location, the first location and the second location. The subset of navigable segments is preferably based on the current location, or the current location and the second location. The area may be, for example, a substantially rectangular or circular shaped area centred on one of the locations, or defined between the current or first location and the second location. The area may have a diameter of the order of tens or hundreds of kilometres, e.g. between 50 and 200 km. The size of the area may be selected based upon the current speed of a navigation device that receives the data, e.g. corresponding to a current speed of travel of a vehicle. For example, where the device (and vehicle) is travelling at 100 km/h, the area may be of greater extent than when the device is travelling at 30 km/h. Thus, in a similar manner to that in which a routing corridor may be defined, the current capacity data that is obtained, e.g. received and/or transmitted, is preferably obtained, e.g. received and/or transmitted, in relation only to a subset of navigable segments that are expected to be considered when generating a route between the first location and the second location. This may avoid the need to transmit excessive amounts of data. The method may comprise a navigation device providing data indicative of one or more of: the current position of the device; the first location; and the second location, to a server, and the server transmitting the current capacity data for the subset of segments to the device. In accordance with the further aspects or embodiments of the invention involving a server transmitting current capacity data, the method may comprise the server receiving data indicative of one or more of: the current position of the client, e.g. navigation, device; and a first location and/or second location between which a route is to be generated, and transmitting current capacity data for a subset of segments of the navigable network to the device, the subset of navigable segments being based on the received data indicative of the current position, first location and/or second location.

The step of obtaining, e.g. receiving, current capacity data may or may not occur before the step of generating the plurality of routes, where the generation of the routes occurs prior to obtaining the flow values for the routes. However, preferably the capacity data is obtained before the routes are generated.

When the method of the present invention is performed in relation to providing multiple routes to be navigated, i.e. by multiple devices or for multiple users, over the population of devices/users as a whole, it can be expected that users will be distributed along the different routes such that the proportion of users directed along each route will reflect the relative flow values for the routes. It will be appreciated that the methods of the present invention may therefore help to balance load across the network in a manner that makes use of actual flow available along different routes. The embodiments can be said to optimize, at least approximately, flow over the network. Of course, the extent to which flow is optimized is constrained by the fact that the present invention considers only a subset of possible routes between the first and second locations. The flow across the network between the first and second locations is at least optimized in relation to the subset of possible routes between the first and second locations corresponding to the generated routes.

In preferred embodiments the method of the present invention is carried out multiple times in relation to providing multiple routes for navigation by different users. Each performance of the method is preferably carried out by a different navigation device, although, as discussed above, a server might perform the method in relation to obtaining the or each route to be navigated. This will enable flow to be effectively distributed over the plurality of routes in accordance with the flow values associated with the routes.

It should be noted that the phrase "associated therewith" in relation to one or more segments should not be interpreted to require any particular restriction on data storage locations. The phrase only requires that the features are identifiably related to a segment. Therefore association may for example be achieved by means of a reference to a side file, potentially located in a remote server.

The term "segment" as used herein takes its usual meaning in the art. A segment may be a navigable link that connects two nodes, or any portion thereof. While embodiments of the present invention are described with reference to road segments, it should be realised that the invention may also be applicable to other navigable segments, such as segments of a path, river, canal, cycle path, tow path, railway line, or the like. For ease of reference these are commonly referred to as a road segment, but any reference to a "road segment" may be replaced by a reference to a "navigable segment" or any specific type or types of such segments.

References to "current capacity data" refer to data indicative of the current capacity data if not explicitly stated herein, and may be replaced by such references.

References to a predetermined route being navigated may be understood in the usual sense in the art to refer to a route along which a user is being guided, e.g. by a navigation device, and preferably in relation to which navigation instruction(s) are being provided. These may be in the form of a display of the route, typically in combination with a set of one or more instructions indicative of, e.g. manoeuvres and other action to be taken by the user to follow the route, which may be given audibly and/or visually. The predetermined route refers to the route being traveled at the time the alternative routes are generated or at least provided to a user.

Any of the methods in accordance with the present invention may be implemented at least partially using software e.g. computer programs. The present invention thus also extends to a computer program comprising computer readable instructions executable to perform, or to cause a navigation device and/or server to perform, a method according to any of the aspects or embodiments of the invention.

The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

Regardless of its implementation, a client device, such as a navigation device, used in accordance with the present invention may comprise a processor, memory, and digital map data stored within said memory. The processor and memory cooperate to provide an execution environment in which a software operating system may be established. One or more additional software programs may be provided to enable the functionality of the apparatus to be controlled, and to provide various other functions. The device preferably includes GPS (Global Positioning System) signal reception and processing functionality. The device may comprise one or more output interfaces by means of which information may be relayed to the user. The output interface(s) may include a speaker for audible output in addition to the visual display. The device may comprise input interfaces including one or more physical buttons to control on/off operation or other features of the device.

In other embodiments, the navigation device may be implemented at least in part by means of an application of a processing device which does not form part of a specific navigation device. For example the invention may be implemented using a suitable computer system arranged to execute navigation software. The system may be a mobile or portable computer system, e.g. a mobile telephone or laptop, or may be a desktop system.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

Advantages of these embodiments are set out hereafter, and further details and features of each of these embodiments are defined in the accompanying dependent claims and elsewhere in the following detailed description.

BRIEF DESCRIPTION OF THE DRAWINGS

Embodiments of the invention will now be described, by way of example only, with reference to the accompanying Figures, in which.

DETAILED DESCRIPTION OF THE FIGURES

Embodiments of the present invention will now be described with particular reference to a Portable Navigation Device (PND). It should be remembered, however, that the teachings of the present invention are not limited to PNDs but are instead universally applicable to any type of processing device that is configured to execute navigation software in a portable manner so as to provide route planning and navigation functionality. It follows therefore that in the context of the present application, a navigation device is intended to include (without limitation) any type of route planning and navigation device, irrespective of whether that device is embodied as a PND, a vehicle such as an automobile, or indeed a portable computing resource, for example a portable personal computer (PC), a mobile telephone or a Personal Digital Assistant (PDA) executing route planning and navigation software.

Further, embodiments of the present invention are described with reference to road segments. It should be realised that the invention may also be applicable to other navigable segments, such as segments of a path, river, canal, cycle path, tow path, railway line, or the like. For ease of reference these are commonly referred to as a road segment.

It will also be apparent from the following that the teachings of the present invention even have utility in circumstances, where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
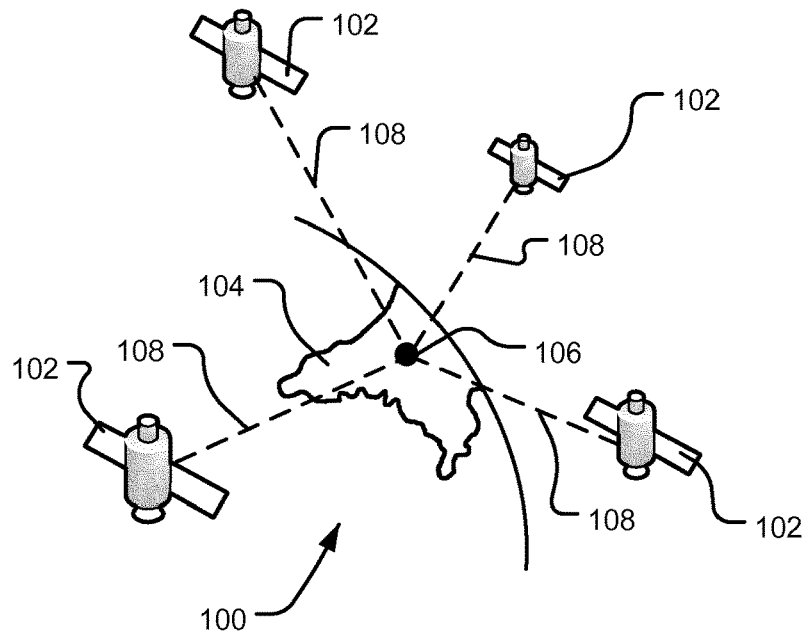
FIG. 1 is a schematic illustration of an exemplary part of a Global Positioning System (GPS) usable by a navigation device.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location, as GPS data, to any number of receiving units. However, it will be understood that Global Positioning systems could be used, such as GLOSNASS, the European Galileo positioning system, COMPASS positioning system or IRNSS (Indian Regional Navigational Satellite System).

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives GPS data as spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
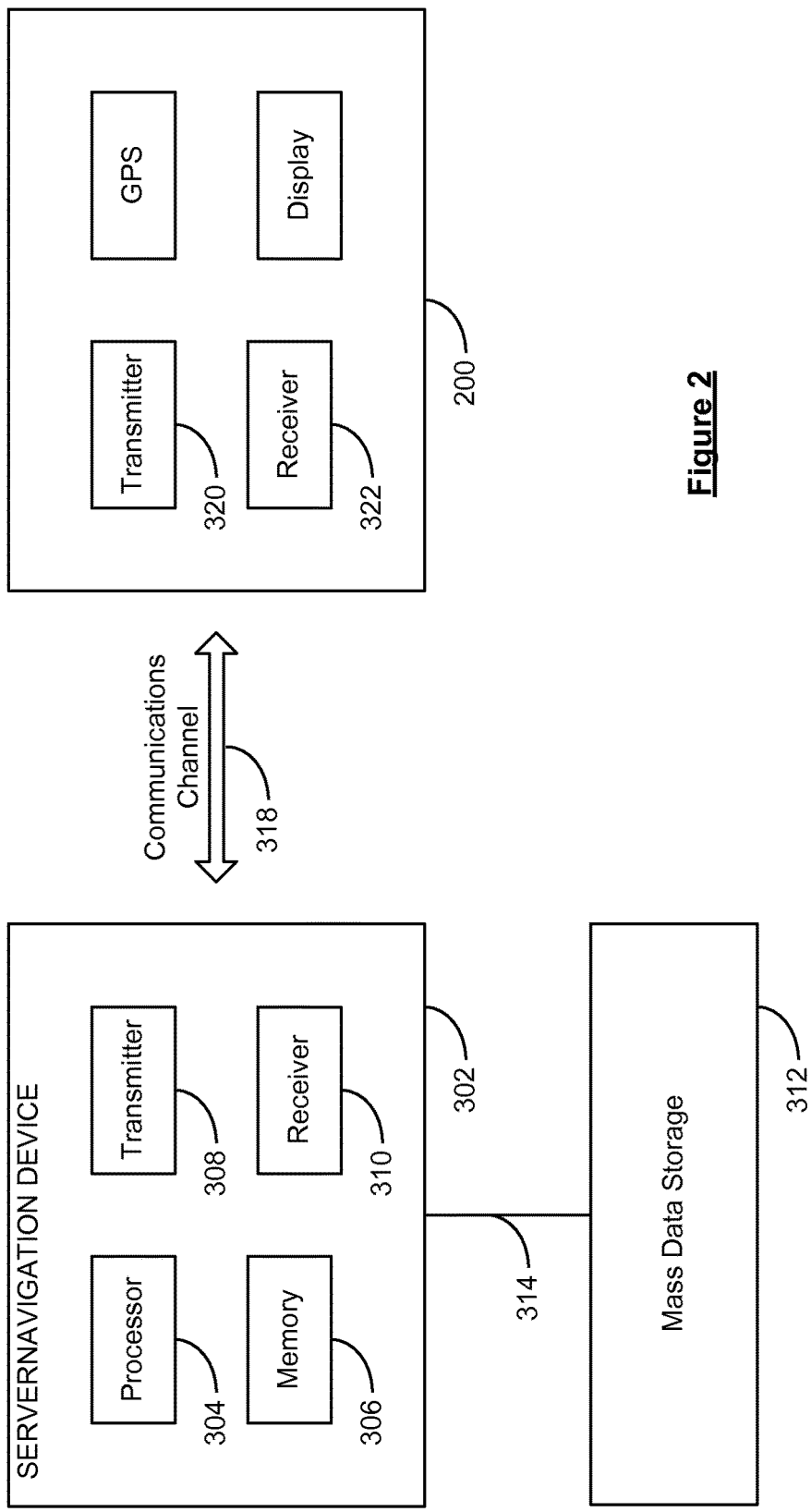
FIG. 2 is a schematic diagram of a communications system for communication between a navigation device and a server.

Turning to FIG. 2, a navigation device 200 (i.e. a PND) comprising or coupled to the GPS receiver device 106, is capable of establishing a data session, if required, with network hardware of a "mobile" or telecommunications network via a mobile device (not shown), for example a mobile telephone, PDA, and/or any device with mobile telephone technology, in order to establish a digital connection, for example a digital connection via known Bluetooth technology. Thereafter, through its network service provider, the mobile device can establish a network connection (through the Internet for example) with a server 150. As such, a "mobile" network connection can be established between the navigation device 200 (which can be, and often times is, mobile as it travels alone and/or in a vehicle) and the server 150 to provide a "real-time" or at least very "up to date" gateway for information.

The establishing of the network connection between the mobile device (via a service provider) and another device such as the server 150, using the Internet for example, can be done in a known manner. In this respect, any number of appropriate data communications protocols can be employed, for example the TCP/IP layered protocol. Furthermore, the mobile device can utilize any number of communication standards such as CDMA2000, GSM, IEEE 802.11 a/b/c/g/n, etc.

Hence, it can be seen that the Internet connection may be utilised, which can be achieved via data connection, via a mobile phone or mobile phone technology within the navigation device 200 for example.

Although not shown, the navigation device 200 may, of course, include its own mobile telephone technology within the navigation device 200 itself (including an antenna for example, or optionally using the internal antenna of the navigation device 200). The mobile phone technology within the navigation device 200 can include internal components, and/or can include an insertable card (e.g. Subscriber Identity Module (SIM) card), complete with necessary mobile phone technology and/or an antenna for example. As such, mobile phone technology within the navigation device 200 can similarly establish a network connection between the navigation device 200 and the server 150, via the Internet for example, in a manner similar to that of any mobile device.

For telephone settings, a Bluetooth enabled navigation device may be used to work correctly with the ever changing spectrum of mobile phone models, manufacturers, etc., model/manufacturer specific settings may be stored on the navigation device 200 for example. The data stored for this information can be updated.

In FIG. 2, the navigation device 200 is depicted as being in communication with the server 150 via a generic communications channel 152 that can be implemented by any of a number of different arrangements. The communication channel 152 generically represents the propagating medium or path that connects the navigation device 200 and the server 150. The server 150 and the navigation device 200 can communicate when a connection via the communications channel 152 is established between the server 150 and the navigation device 200 (noting that such a connection can be a data connection via mobile device, a direct connection via personal computer via the Internet, etc.).

The communication channel 152 is not limited to a particular communication technology. Additionally, the communication channel 152 is not limited to a single communication technology; that is, the channel 152 may include several communication links that use a variety of technology. For example, the communication channel 152 can be adapted to provide a path for electrical, optical, and/or electromagnetic communications, etc. As such, the communication channel 152 includes, but is not limited to, one or a combination of the following: electric circuits, electrical conductors such as wires and coaxial cables, fibre optic cables, converters, radio-frequency (RF) waves, the atmosphere, free space, etc. Furthermore, the communication channel 152 can include intermediate devices such as routers, repeaters, buffers, transmitters, and receivers, for example.

In one illustrative arrangement, the communication channel 152 includes telephone and computer networks. Furthermore, the communication channel 152 may be capable of accommodating wireless communication, for example, infrared communications, radio frequency communications, such as microwave frequency communications, etc. Additionally, the communication channel 152 can accommodate satellite communication.

The communication signals transmitted through the communication channel 152 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), General Packet Radio Service (GPRS), etc. Both digital and analogue signals can be transmitted through the communication channel 152. These signals may be modulated, encrypted and/or compressed signals as may be desirable for the communication technology.

The server 150 includes, in addition to other components which may not be illustrated, a processor 154 operatively connected to a memory 156 and further operatively connected, via a wired or wireless connection 158, to a mass data storage device 160. The mass storage device 160 contains a store of navigation data and map information, and can again be a separate device from the server 150 or can be incorporated into the server 150. The processor 154 is further operatively connected to transmitter 162 and receiver 164, to transmit and receive information to and from navigation device 200 via communications channel 152. The signals sent and received may include data, communication, and/or other propagated signals. The transmitter 162 and receiver 164 may be selected or designed according to the communications requirement and communication technology used in the communication design for the navigation system 200. Further, it should be noted that the functions of transmitter 162 and receiver 164 may be combined into a single transceiver.

As mentioned above, the navigation device 200 can be arranged to communicate with the server 150 through communications channel 152, using transmitter 166 and receiver 168 to send and receive signals and/or data through the communications channel 152, noting that these devices can further be used to communicate with devices other than server 150. Further, the transmitter 166 and receiver 168 are selected or designed according to communication requirements and communication technology used in the communication design for the navigation device 200 and the functions of the transmitter 166 and receiver 168 may be combined into a single transceiver as described above in relation to FIG. 2. Of course, the navigation device 200 comprises other hardware and/or functional parts, which will be described later herein in further detail.

Software stored in server memory 156 provides instructions for the processor 154 and allows the server 150 to provide services to the navigation device 200. One service provided by the server 150 involves processing requests from the navigation device 200 and transmitting navigation data from the mass data storage 160 to the navigation device 200. Another service that can be provided by the server 150 includes processing the navigation data using various algorithms for a desired application and sending the results of these calculations to the navigation device 200.

The server 150 constitutes a remote source of data accessible by the navigation device 200 via a wireless channel. The server 150 may include a network server located on a local area network (LAN), wide area network (WAN), virtual private network (VPN), etc.

The server 150 may include a personal computer such as a desktop or laptop computer, and the communication channel 152 may be a cable connected between the personal computer and the navigation device 200. Alternatively, a personal computer may be connected between the navigation device 200 and the server 150 to establish an Internet connection between the server 150 and the navigation device 200.

The navigation device 200 may be provided with information from the server 150 via information downloads which may be updated automatically, from time to time, or upon a user connecting the navigation device 200 to the server 150 and/or may be more dynamic upon a more constant or frequent connection being made between the server 150 and navigation device 200 via a wireless mobile connection device and TCP/IP connection for example. For many dynamic calculations, the processor 154 in the server 150 may be used to handle the bulk of processing needs, however, a processor (not shown in FIG. 2) of the navigation device 200 can also handle much processing and calculation, oftentimes independent of a connection to a server 150.

Figure 3:
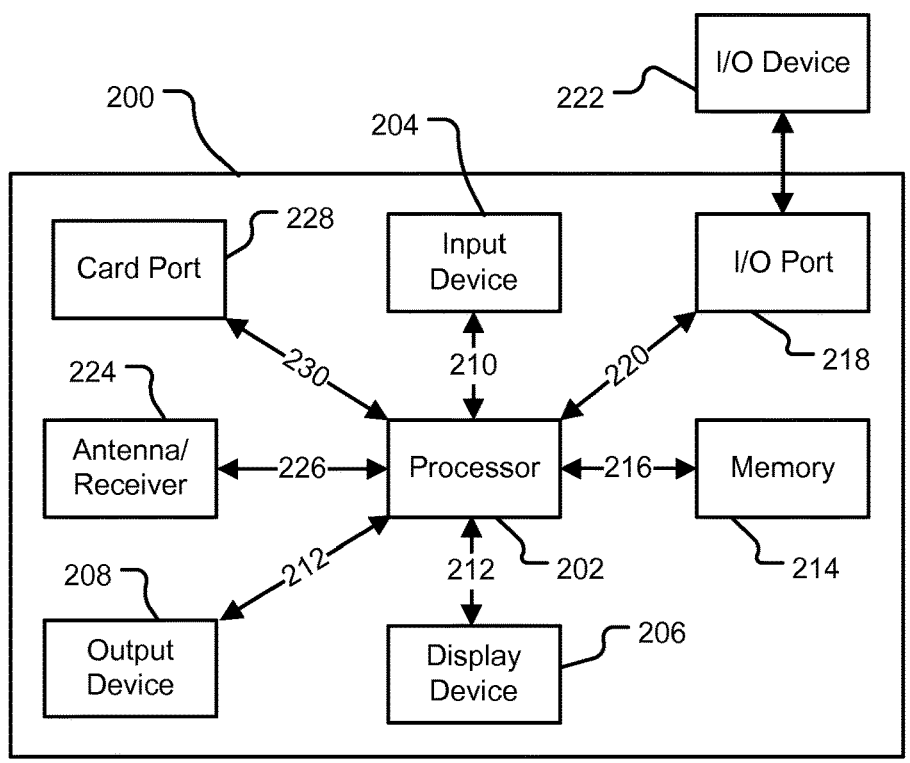
FIG. 3 is a schematic illustration of electronic components of the navigation device of FIG. 2 or any other suitable navigation device.

Referring to FIG. 3, it should be noted that the block diagram of the navigation device 200 is not inclusive of all components of the navigation device, but is only representative of many example components. The navigation device 200 is located within a housing (not shown). The navigation device 200 includes processing circuitry comprising, for example, the processor 202 mentioned above, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, one aspect of the input device 204, the touch panel, and the display screen 206 are integrated so as to provide an integrated input and display device, including a touchpad or touchscreen input 250 (FIG. 4) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation device 200, the processor 202 is operatively connected to and capable of receiving input information from input device 204 via a connection 210, and operatively connected to at least one of the display screen 206 and the output device 208, via respective output connections 212, to output information thereto. The navigation device 200 may include an output device 208, for example an audible output device (e.g. a loudspeaker). As the output device 208 can produce audible information for a user of the navigation device 200, it should equally be understood that input device 204 can include a microphone and software for receiving input voice commands as well. Further, the navigation device 200 can also include any additional input device 204 and/or any additional output device, such as audio input/output devices for example.

The processor 202 is operatively connected to memory 214 via connection 216 and is further adapted to receive/send information from/to input/output (I/O) ports 218 via connection 220, wherein the I/O port 218 is connectable to an I/O device 222 external to the navigation device 200. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish a data connection between the navigation device 200 and the Internet or any other network for example, and/or to establish a connection to a server via the Internet or some other network for example.

The memory 214 of the navigation device 200 comprises a portion of non-volatile memory (for example to store program code) and a portion of volatile memory (for example to store data as the program code is executed). The navigation device also comprises a port 228, which communicates with the processor 202 via connection 230, to allow a removable memory card (commonly referred to as a card) to be added to the device 200. In the embodiment being described the port is arranged to allow an SD (Secure Digital) card to be added. In other embodiments, the port may allow other formats of memory to be connected (such as Compact Flash (CF) cards, Memory Sticks, xD memory cards, USB (Universal Serial Bus) Flash drives, MMC (MultiMedia) cards, SmartMedia cards, Microdrives, or the like). FIG. 3 further illustrates an operative connection between the processor 202 and an antenna/receiver 224 via connection 226, wherein the antenna/receiver 224 can be a GPS antenna/receiver for example and as such would function as the GPS receiver 106 of FIG. 1. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 3 are powered by one or more power sources (not shown) in a conventional manner. Such power sources may include an internal battery and/or a input for a low voltage DC supply or any other suitable arrangement. As will be understood by one of ordinary skill in the art, different configurations of the components shown in FIG. 3 are contemplated. For example, the components shown in FIG. 3 may be in communication with one another via wired and/or wireless connections and the like. Thus, the navigation device 200 described herein can be a portable or handheld navigation device 200.

In addition, the portable or handheld navigation device 200 of FIG. 3 can be connected or "docked" in a known manner to a vehicle such as a bicycle, a motorbike, a car or a boat for example. Such a navigation device 200 is then removable from the docked location for portable or handheld navigation use. Indeed, in other embodiments, the device 200 may be arranged to be handheld to allow for navigation of a user.

Figure 4:
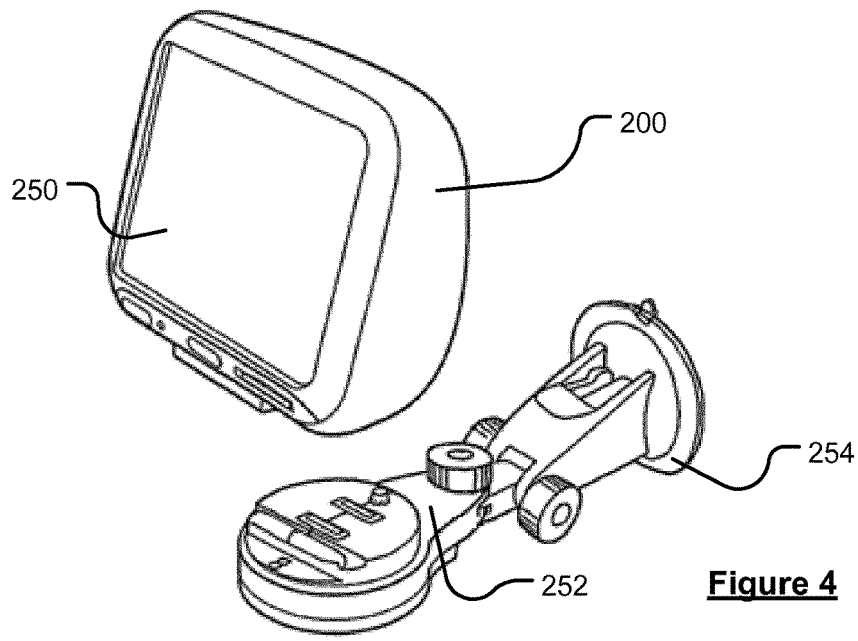
FIG. 4 is a schematic diagram of an arrangement of mounting and/or docking a navigation device.

Referring to FIG. 4, the navigation device 200 may be a unit that includes the integrated input and display device 206 and the other components of FIG. 2 (including, but not limited to, the internal GPS receiver 224, the processor 202, a power supply (not shown), memory systems 214, etc.).

The navigation device 200 may sit on an arm 252, which itself may be secured to a vehicle dashboard/window/etc. using a suction cup 254. This arm 252 is one example of a docking station to which the navigation device 200 can be docked. The navigation device 200 can be docked or otherwise connected to the arm 252 of the docking station by snap connecting the navigation device 200 to the arm 252 for example. The navigation device 200 may then be rotatable on the arm 252. To release the connection between the navigation device 200 and the docking station, a button (not shown) on the navigation device 200 may be pressed, for example. Other equally suitable arrangements for coupling and decoupling the navigation device 200 to a docking station are well known to persons of ordinary skill in the art.

In the embodiment being described, the processor 202 of the navigation device is programmed to receive GPS data received by the antenna 224 and, from time to time, to store that GPS data, together with a time stamp of when the GPS data was received, within the memory 214 to build up a record of the location of the navigation device. Each data record so-stored may be thought of as a GPS fix; i.e. it is a fix of the location of the navigation device and comprises a latitude, a longitude, a time stamp and an accuracy report.

In one embodiment the data is stored substantially on a periodic basis which is for example every 5 seconds. The skilled person will appreciate that other periods would be possible and that there is a balance between data resolution and memory capacity; i.e. as the resolution of the data is increased by taking more samples, more memory is required to hold the data. However, in other embodiments, the resolution might be substantially every: 1 second, 10 seconds, 15 seconds, 20 seconds, 30 seconds, 45 seconds, 1 minute, 2.5 minutes (or indeed, any period in between these periods). Thus, within the memory of the device there is built up a record of the whereabouts of the device 200 at points in time. In some embodiments, it may be found that the quality of the captured data reduces as the period increases and whilst the degree of degradation will at least in part be dependent upon the speed at which the navigation device 200 was moving a period of roughly 15 seconds may provide a suitable upper limit. Whilst the navigation device 200 is generally arranged to build up a record of its whereabouts, some embodiments, do not record data for a predetermined period and/or distance at the start or end of a journey. Such an arrangement helps to protect the privacy of the user of the navigation device 200 since it is likely to protect the location of his/her home and other frequented destinations. For example, the navigation device 200 may be arranged not to store data for roughly the first 5 minutes of a journey and/or for roughly the first mile of a journey.

In other embodiments, the GPS may not be stored on a periodic basis but may be stored within the memory when a predetermined event occurs. For example, the processor 202 may be programmed to store the GPS data when the device passes a road junction, a change of road segment, or other such event.

Further, the processor 202 is arranged, from time to time, to upload the record of the whereabouts of the device 200 (i.e. the GPS data and the time stamp) to the server 150. In some embodiments in which the navigation device 200 has a permanent, or at least generally present, communication channel 152 connecting it to the server 150 the uploading of the data occurs on a periodic basis which may for example be once every 24 hours. The skilled person will appreciate that other periods are possible and may be substantially any of the following periods: 15 minutes, 30 minutes, hourly, every 2 hours, every 5 hours, every 12 hours, every 2 days, weekly, or any time in between these. Indeed, in such embodiments the processor 202 may be arranged to upload the record of the whereabouts on a substantially real time basis, although this may inevitably mean that data is in fact transmitted from time to time with a relatively short period between the transmissions and as such may be more correctly thought of as being pseudo real time. In such pseudo real time embodiments, the navigation device may be arranged to buffer the GPS fixes within the memory 214 and/or on a card inserted in the port 228 and to transmit these when a predetermined number have been stored. This predetermined number may be on the order of 20, 36, 100, 200 or any number in between. The skilled person will appreciate that the predetermined number is in part governed by the size of the memory 214 or card within the port 228.

In other embodiments, which do not have a generally present communication channel 152 the processor 202 may be arranged to upload the record to the server 152 when a communication channel 152 is created. This may for example, be when the navigation device 200 is connected to a user's computer. Again, in such embodiments, the navigation device may be arranged to buffer the GPS fixes within the memory 214 or on a card inserted in the port 228. Should the memory 214 or card inserted in the port 228 become full of GPS fixes the navigation device may be arranged to delete the oldest GPS fixes and as such it may be thought of as a First in First Out (FIFO) buffer.

In the embodiment being described, the record of the whereabouts comprises one or more traces with each trace representing the movement of that navigation device 200 within a 24 hour period. Each 24 is arranged to coincide with a calendar day but in other embodiments, this need not be the case.

Generally, a user of a navigation device 200 gives his/her consent for the record of the devices whereabouts to be uploaded to the server 150. If no consent is given then no record is uploaded to the server 150. The navigation device itself, and/or a computer to which the navigation device is connected may be arranged to ask the user for his/her consent to such use of the record of whereabouts.

The server 150 is arranged to receive the record of the whereabouts of the device and to store this within the mass data storage 160 for processing. Thus, as time passes the mass data storage 160 accumulates a plurality of records of the whereabouts of navigation devices 200 which have uploaded data.

As discussed above, the mass data storage 160 also contains map data. Such map data provides information about the location of road segments, points of interest and other such information that is generally found on map.

An embodiment of the invention will now be described by reference to FIGS. 5, 6 and 7.

Figure 5:
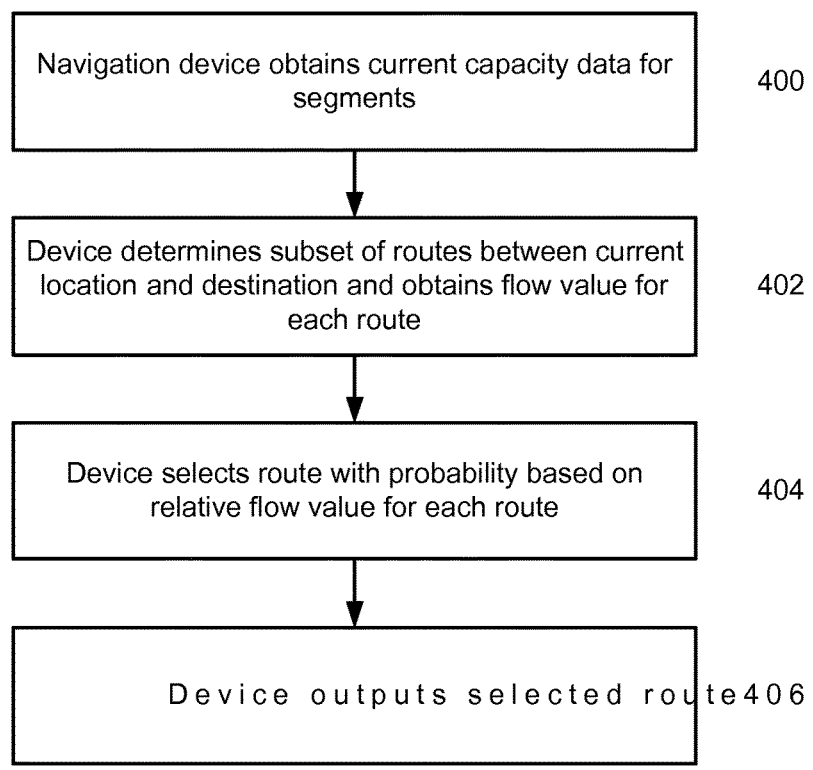
FIG. 5 is a flowchart illustrating the steps of a method in accordance with one embodiment of the invention.

Referring now to FIG. 5, the invention will be described by reference to a preferred embodiment in which the steps are carried out by a navigation device. The navigation device is associated with a vehicle, and may be a PND or integrated navigation device.

The navigation device stores an electronic map comprising data representative of a network of road segments. The steps of the method are implemented while the vehicle, with which the navigation device is associated, travels along a predetermined route to a destination. When the device, and hence vehicle, reaches a particular location along the route, it is determined that a remainder of the route is affected by congestion. The navigation device may receive traffic updates from a server via a telecommunications system, or by other means, such as via a radio broadcast system. The navigation device now needs to calculate an alternative route from the current location to the original destination that avoids the region of congestion. It will be appreciated that in other embodiments the invention may be implemented at other times than when navigating along a predetermined route, and the alternative route that is to be generated may be between any first and second location, not necessarily a current location and destination of a predetermined route being followed.

As a first step of this process the navigation device receives current capacity data for road segments within a predetermined area of the device's current location from a server—step 400. The server is a server of a real-time traffic information system. This may be in response to a request by the navigation device. Alternatively the predetermined area may be based on the current location and the intended destination of the navigation device or similar, such that the current capacity data is only transmitted for road segments falling within a particular area that is expected to be considered when determining the alternative routes. The current capacity data received is based on live data. For example, the server may generate the data based on data received via one or more live traffic feeds.

The received current capacity data may be in the form of current relative capacity data, indicative of the current capacity of a segment as a proportion of the maximum capacity of the segment. The maximum capacity of the segment may be a threshold value above which the segment is considered to become congested, or may be an artificial arbitrary maximum capacity value which is set by a third party, such as a traffic management centre, as being a desirable maximum level of traffic flow for that segment, e.g. to maintain environmental impact at or below a certain level. In these embodiments the server will store maximum capacity data for each of the road segments for use in obtaining the relative current capacity data.

In other embodiments, it is envisaged that the server may transmit absolute current capacity values for the segments, which the navigation device may use to derive relative current capacity data for use in the methods of the invention based on maximum capacity data stored for the segments by the navigation device, or otherwise derived by the device using attributes of the segments in the electronic map data of the device. A decision as to whether to transmit absolute or relative capacity data may be based upon the available storage power of the navigation device, and the amount of bandwidth available for transmission of data between the server and device.

In yet further arrangements the navigation device may be arranged to store time-dependent historic capacity values for road segments represented by the electronic map. Each road segment may be associated with multiple capacity values in respect of different timeslots, e.g. days of the week, peak or off-peak periods, weekends, night times, etc. The server may be arranged to transmit current capacity data to the device only if the current capacity value based on live data differs from the historic value by a predetermined amount. If no new current capacity value is received by the device from the server, the device will use the stored historic capacity value for the segment that is applicable to the time for which the generated route is required, i.e. a current time. Thus the current capacity data used by the navigation device may be based in part on historic capacity values, and in part on received live capacity values. The device may first convert the historic data to relative capacity data if needed.

In yet other arrangements, rather than receiving the data over a telecommunications system, the navigation device may receive the current capacity data through the data being broadcast on radio frequencies (such as the TMC system), used to provide real-time traffic information.

The device then generates a plurality of routes that are a subset of possible routes between the current location and destination. This may be achieved using standard routing algorithms as known in the art. The device also obtains a relative flow value for each route—step 402.

In some embodiments, a specific algorithm is used to determine a number, in embodiments a predetermined number, of routes between the current location and the destination, and, subsequently, the current capacity data relating to the segments of the routes is used to determine a relative flow value for each route. In other preferred embodiments, the steps of generating the subset of possible routes and obtaining the flow values for the routes using current capacity data for segments of the road network are carried out concurrently. For example, an algorithm can determine a first optimum route between a first location and a second location, e.g. the fastest, shortest, cheapest, most ecological, etc, and then determine any alternate routes within a predetermined threshold of the optimum route, e.g. any routes within 10%, 20%, etc of the determined fastest, shortest, cheapest, most ecological route. In these embodiments the route determination and relative flow values may be determined concurrently by the same algorithm. It has been found that an algorithm based on the Ford-Fulkerson algorithm may be used to determine the plurality of routes between a first and second location, e.g. a current location and destination, for use in the present invention, together with a relative flow value for each route. FIG. 6 shows three routes computed using an algorithm based on the Ford-Fulkerson algorithm according to an embodiment of the invention; the algorithm further computing the flow values (and thus probability distribution) for each route. The flow values of the subset of routes, and indeed other routes considered on obtaining the subset of routes, are based on the current capacity data for road segments (also indicated in FIG. 6).

The flow values obtained for each of the plurality of generated routes between the current location and destination are determined based on a condition in which there is maximum flow from the current location to the destination through a network consisting of the plurality of generated routes, i.e. taking into consideration only this subset of all possible routes between the current location and the destination.

In the next step 404, a route is randomly selected by the device from among the generated routes i.e. the subset of possible routes between the current location and the destination. The probability of each route being selected from among the plurality of routes is based on the determined relative flow value for the route. For example, if there are 3 routes, and the flow is determined to be split 70%:20%:10% between the three routes, then the probability of the device selecting each route is weighted 70:20:10 accordingly. This means that over the entire population of devices performing the method of the invention, the routes selected by devices, and along which users will be directed, will also be split approximately 70:20:10. In this way, users are redirected to avoid the area of congestion, but in a manner which should avoid creation of new areas of congestion, instead optimizing, at least approximately, the flow over the network. Of course, the optimization is constrained by the fact that only a subset of all possible routes are considered; albeit a set of routes that is deemed acceptable to a user. However, by considering a limited number of routes, it has been found that reasonable balancing of flow across the network may be obtained in a computationally efficient manner.

In the next step 406, the navigation device generates a set of navigation instructions for guiding a user along the selected route.

Figure 6:
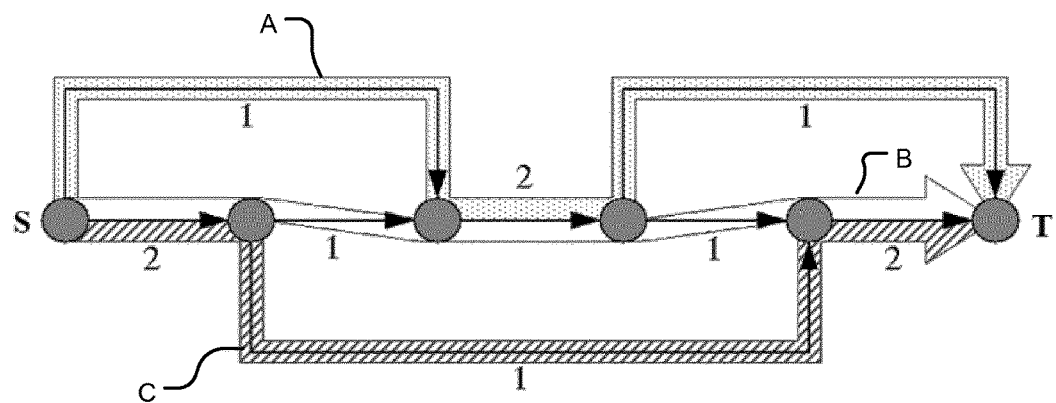
FIG. 6 illustrates the way in which the methods of the invention may be implemented in relation to three alternative routes between an origin and destination.
Figure 7:
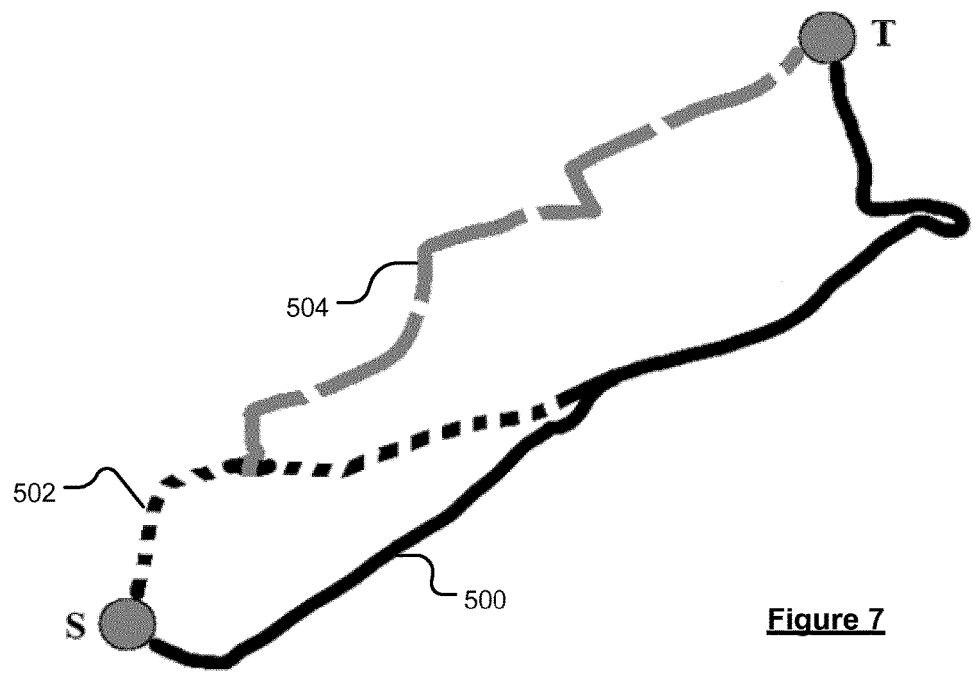
FIG. 7 illustrates three possible alternative routes between an origin and destination in relation to which the invention may be implemented.

FIGS. 6 and 7 illustrate the way in which the invention may be implemented in relation to exemplary sets of routes between an origin and destination.

FIG. 6 illustrates three routes, labeled A, B and C, which may be generated between an origin S and a destination T, e.g. by a navigation device. These routes may be generated in any of the manners described above. For example, the routes may be the three lowest cost routes determined between S and T using the applicable cost function, or may be three routes having flow exceeding a given threshold. The three routes A, B and C provide a subset of possible routes through the road network between S and T which are considered for the purposes of the invention. Each of the segments forming part of a route has a current relative capacity value. The navigation device may receive or otherwise determine data indicative of the current relative capacity of a segment in any of the manners described above.

Using the current relative current capacity of a segment, it is possible to determine a flow value for the segment under conditions of maximum flow between S and T. This is done using an algorithm based on the Ford-Fulkerson algorithm for determining maximal flow between points of a network. The flow values along each of the segments forming part of a route is also indicated in FIG. 6. A flow value for each route, and a relative flow value for each route as a proportion of the total flow along routes A, B and C is determined. For example, it may be determined that the relative flow values for routes A, B and C respectively will be equal, i.e. 33%.

The navigation device then randomly selects one of routes A, B and C for use in navigation. The probability of selecting a given one of the routes A, B or C is weighted in accordance with the relative flow value for the route. In this case, each route is weighted equally giving a probability of 33% for each of the routes.

Another navigation device wishing to obtain a route between S and T would perform the same calculations, resulting in the selection of one of the routes in accordance with the above probabilities. When implemented by numerous navigation devices in this way, the method will result in drivers being provided with routes between S and T that spread traffic more evenly over the three routes in accordance with their capacity.

FIG. 7 illustrates a set of three exemplary routes 500, 502 and 504 between an origin S and destination T, from which a route to be navigated may be selected with the appropriate probability based upon relative flow for that route, e.g. as described by reference to FIG. 6. As in the FIG. 6 embodiment, certain road segments are shared between routes. For example, routes 502 and 504 share a segment starting from the origin S before diverging. Route 502 then converges with route 500 toward the destination T. When the present invention is implemented in relation to these routes, traffic flow will be distributed among the alternative routes 500, 502 and 504 between S and T more evenly. As may be seen from FIG. 8, if it is necessary to calculate alternative routes between S and T, the present invention does this in a manner that does not result in traffic merely being transferred to another route that then becomes congested, but distributes the traffic flow appropriately between different routes.

While the present invention has been described by reference to a navigation device generating the plurality of routes, and selecting a route to be navigated therefrom, it is envisaged that the methods could be implemented by a server, with the server then transmitting the selected route to a navigation device.

It will be seen that the invention in any of its embodiments thus provides a method which enables routes to be generated in a road network for use by multiple devices, e.g. to avoid a region of congestion, in a manner which may balance flow across the network. This is achieved without the need for a navigation device to have to request a server to determine the route, e.g. as in prior art techniques in which central coordination between routes for different navigation devices is needed. A navigation device may independently obtain a route that may maintain flow across the network without knowledge of routes that are to be used by other devices. Similarly if implemented by a server, the processing power required is significantly reduced, in that the server may generate routes for navigation devices on a case by case basis, without needing to refer to routes generated for other devices.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of determining a route in an area covered by an electronic map, the electronic map comprising a plurality of segments representing navigable segments of a navigable network in the area covered by the electronic map, the method comprising:
    generating, using a processor, a plurality of routes through the navigable network between a first location and a second location, the generating comprising, selecting, as the plurality of routes, a subset of possible routes between the first location and the second location, the plurality of routes including a first route that is most optimal among the possible routes for a specified route parameter and at least one other route from among the possible routes having the specified route parameter within a predetermined range of the first route;
    determining, using the processor, a relative traffic flow value for each of the routes using data indicative of a current capacity of segments of the navigable network, the relative traffic flow value for each route being indicative of a traffic flow value for the route relative to a total traffic flow value for all of the plurality of routes;
    randomly selecting, using the processor, a given one of the routes from among the plurality of routes for use in navigating between the first location and the second location with a probability of selecting each route being based on the determined relative flow value for the route, so that any route among the plurality of routes can be selected with a probability that is proportional to the flow rate for the route relative to the total traffic flow value for all of the plurality or routes; and
    outputting, using the processor, data indicative of the selected route.

2. The method of claim 1, wherein the first location is a location at or ahead of current location along a predetermined route being navigated.

3. The method of claim 1, wherein the specified route parameter is a time for traveling a given route or a distance of the given route.

4. The method of claim 1, wherein the current capacity data of each navigable segment that is used in determining the flow values for the routes is indicative of the current capacity of the segment relative to a maximum capacity for the segment.

5. The method of claim 1, wherein the current capacity data for each navigable segment used in determining the flow values for each of the routes is based at least in part on live capacity data.

6. The method of claim 1, wherein the relative flow values determined for each of the plurality of routes are based on a flow along each of the routes under conditions of maximum flow between the first and second locations via the plurality of routes between the first location and the second location.

7. The method of claim 1, wherein the probability for selecting a given route is proportional or corresponds to the flow value for the route.

8. The method of claim 1, further comprising receiving the current capacity data over a telecommunications network.

9. The method of claim 1, wherein said outputting comprises outputting the selected route to a user.

10. The method of claim 1, wherein said outputting comprises providing a set of navigation instructions for guiding a user along the selected route.

11. The method of claim 1, wherein the method is carried out by a navigation device.

12. A system, comprising one or more processors and a memory storing an electronic map, the electronic map comprising a plurality of segments representing navigable segments of a navigable network in a area covered by the electronic map, the one or more processors being arranged to:
    generate a plurality of routes through the navigable network between a first location and a second location, the generating comprising, selecting, as the plurality of routes, a subset of possible routes between the first location and the second location, the plurality of routes including a first route that is most optimal among the possible routes for a specified route parameter and at least one other route from among the possible routes having the specified route parameter within a predetermined range of the first route;
    determine a relative traffic flow value for each of the routes using data indicative of a current capacity of segments of the navigable network, the relative traffic flow value for each of the routes being indicative of a traffic flow value for the route relative to a total traffic flow value for all of the plurality of routes;
    randomly select a given one of the routes from among the plurality of routes for use in navigating between the first location and the second location with a probability of selecting each route being based on the determined relative flow value for the route, so that any route among the plurality of routes can be selected with a probability that is proportional to the flow rate for the route relative to the total traffic flow value for all of the plurality of routes; and output data indicative of the selected route.

13. The system of claim 12, wherein the system is a mobile device.

14. The system of claim 13, wherein the system is a portable navigation device.

15. The system of claim 13, wherein the mobile device is arranged to store data indicative of time-dependent historical capacity of segments of the navigable network.

16. The system of claim 15, wherein the mobile device is communicatively coupled to a server and arranged to receive the current capacity of segments of the navigable network from the server.

17. The system of claim 16, wherein the mobile device is arranged to receive the current capacity of a road segment of the segments of the navigable network when live data differs from the historical capacity for the road segment.

18. A non-transitory computer readable medium comprising instructions which, when executed by one or more processors of a system, cause the system to perform a method of determining a route in an area covered by an electronic map, the electronic map comprising a plurality of segments representing navigable segments of a navigable network in the area covered by the electronic map, the method comprising:

generating, using a processor, a plurality of routes through the navigable network between a first location and a second location, the generating comprising, selecting, as the plurality of routes, a subset of possible routes between the first location and the second location, the plurality of routes including a first route that is most optimal among the possible routes for a specified route parameter and at least one other route from among the possible routes having the specified route parameter within a predetermined range of the first route;

determining, using the processor, a relative traffic flow value for each of the routes using data indicative of a current capacity of segments of the navigable network, the relative traffic flow value for each route being indicative of a traffic flow value for the route relative to a total traffic flow value for all of the plurality of routes;

randomly selecting, using the processor, a given one of the routes from among the plurality of routes for use in navigating between the first location and the second location with a probability of selecting each route being based on the determined relative flow value for the route, so that any route among the plurality of routes can be selected with a probability that is proportional to the flow rate for the route relative to the total traffic flow value for all of the plurality of routes; and outputting, using the processor, data indicative of the selected route.

* * * * *